Patented Apr. 3, 1928.

1,664,601

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

CASSAVA-STARCH PLASTIC COMPOSITION AND METHOD OF MOLDING SAME.

No Drawing. Application filed May 27, 1926, Serial No. 112,177. Renewed July 14, 1927.

This invention relates to a composition containing cassava starch together with certain resins and extending agents, all as will be more fully hereinafter described.

The present invention is directed to the use of cassava starch as a binding agent to secure a strength in molded articles not readily obtainable when corn starch, wheat starch, potato starch, and the like, are employed. In carrying out my invention I do not preclude the employment of such other starches, but essentially the composition must contain cassava starch.

With the cassava starch I incorporate a resinous substance such as manila, congo or pontianac resin, rosin ester, and/or ordinary rosin, especially the type known as wood rosin or stump rosin. Other resinous substances and also tars, pitches, asphalts, and gilsonite may be used in some cases. Dark colored molded articles are obtained when such asphaltic bodies are employed, whereas with some of the resins such as ordinary rosin or stump rosin, light colored molded articles result. The composition may be tinted a suitable color with appropriate pigments or dyes. Agents such as essential oils, e. g., oil of cedarwood, may be added to give the product a definite or readily recognized odor.

An extending material such as ground wood or wood flour also preferably is present. Other powdered material such as clay, talc, whiting, asbestos fibre, ground asbestos and asbestine, wood flock, cotton linters, and the like, also may be present.

Water also preferably is present in considerable quantity. In any event, a sufficient amount is desired to burst the cassava starch granules when these are exposed to heat is molding. In some cases, it is preferable to break up the cassava starch to some extent by pre-cooking, or other treatment. The water gives the composition a greater flowing power, so that it may be molded in shapes of quite large dimensions, but when molding pieces of from moderate to large size considerable care is required to permit of the escape of the moisture from the hot mold. The water may contain a small amount of glycerol, or in some cases, may carry an emulsion of paraffin wax or other wax emulsion, e. g., carnauba, to allow of special waterproofing effects and the like.

A composition which may be made cheaply is composed of the following illustrative ingredients, the proportions being by weight:

| | Parts. |
|---|---|
| Powdered rosin | 140 |
| Cassava starch | 240 |
| Wood flour | 440 |
| Water | 400 to 500 |

These ingredients are mixed in a Werner & Pfleiderer mixing machine, or other suitable mixing device, and when uniformly mixed the composition is ready for use.

A quantity is placed in a hot mold and the plunger applied, giving a pressure of several pounds, or more, to the square inch. Preferably the sides of the mold are made slightly tapering to allow the escape of steam, or the plunger may be withdrawn part way during the first stages of the pressing, as this procedure permits of the escape of excess moisture. The temperature is preferably between 150–200° C., although higher temperatures may be employed in some cases.

An object is to have the proportion of water such that it is absorbed by the wood flour and when the mixture is subjected to hot pressing, the moisture ruptures the cassava starch granules, and the starchy solution or paste thus produced forming about the rosin and wood flour creates a condition whereby the composition tends to harden in the press and thus makes possible the removal of the molded article while it is still fairly hot. This enables the pressing operation to be carried on rapidly without the necessity of cooling the mold before removal of the plastic article.

The invention therefore comprises molded articles made from cassava starch, a resin and a finely-divided extending agent and the process specifically adaptable to a molding composition containing water is that of carrying out hot pressing under conditions which allow of the escape of steam, whereby further drying out in the mold occurs and hardening takes place sufficiently to enable the withdrawal from the mold of a molded article, which, although hot, is not readily deformed by the handling which necessarily ensues.

As indicated, the composition given above is illustrative and various modifications may be made including a considerable variation in proportions.

In a copending case 108,987 filed May 13,

1926, I have described and claimed a molding composition comprising cassava starch, a fusible binder such as sulphur, and a filler, and preferably also water, with which may also be included various resins and adhesive substances, such composition when hot molded, having the property of thermo-setting.

What I claim is:

1. A molded article comprising cassava starch, a resin and wood flour.

2. A molded article comprising cassava starch, rosin, and finely-divided extending material.

3. The process of making molded articles from a mixture of cassava starch, rosin, wood flour and water, which comprises hot-pressing such a mixture in a suitable mold and permitting the escape of steam during the pressing stage.

CARLETON ELLIS.